United States Patent [19]

Passarelli

[11] Patent Number: 5,232,556

[45] Date of Patent: Aug. 3, 1993

[54] WATER DESALINATION APPARATUS

[76] Inventor: Frank J. Passarelli, 1940 Malcolm Ave., Los Angeles, Calif. 90025

[21] Appl. No.: 767,422

[22] Filed: Sep. 30, 1991

[51] Int. Cl.⁵ .................. B01D 1/22; B01D 3/10
[52] U.S. Cl. .................. 202/177; 159/13.3; 159/13.4; 159/27.1; 159/DIG. 16; 159/24.2; 159/49; 202/194; 202/195; 202/205; 202/236; 202/237; 203/11; 203/24; 203/27; 203/91; 203/DIG. 8; 203/DIG. 17; 203/89
[58] Field of Search ............ 202/177, 176, 237, 194, 202/195, 205, 236, 179, 198; 159/27.1, 24.2, 27.4, DIG. 16, 13.3, 13.4, 49; 203/91, 89, 27, 11, DIG. 8, DIG. 17, 24

[56] References Cited

U.S. PATENT DOCUMENTS

| | | | |
|---|---|---|---|
| 2,379,519 | 7/1945 | Hall | 202/177 |
| 2,389,789 | 11/1945 | Latham, Jr. | 203/24 |
| 2,487,884 | 11/1949 | Lunt | 203/24 |
| 2,619,453 | 11/1952 | Anderson | 202/177 |
| 2,637,684 | 5/1953 | Buffum | 202/177 |
| 2,696,465 | 12/1954 | Kittredge | 203/24 |
| 3,575,815 | 4/1971 | Sech | 202/164 |
| 3,725,206 | 4/1973 | Foley | 202/177 |
| 3,856,632 | 12/1974 | Peta | 202/173 |
| 4,710,272 | 12/1987 | Passarelli et al. | 202/205 |

FOREIGN PATENT DOCUMENTS 0530106 9/1956 Canada .................. 202/163

Primary Examiner—Virginia Manoharan
Attorney, Agent, or Firm—Jack C. Munro

[57] ABSTRACT

A water desalination apparatus which is constructed of a main housing which includes a condensation chamber and a vapor chamber located above the condensation chamber. Brackish water is to be supplied into the vapor chamber with this brackish water to produce a vapor which is to be removed by a centrifugal compressor arrangement into the condensation chamber. The condensed brackish water from the vapor chamber is to flow through a mass of thin-walled tubes to be eventually discharged into the ambient. The exterior wall of these tubes is located within the condensation chamber and it is on the walls of these tubes that the distilled water vapor is to collect and condense and flow from the condensation chamber to a collection source.

5 Claims, 4 Drawing Sheets

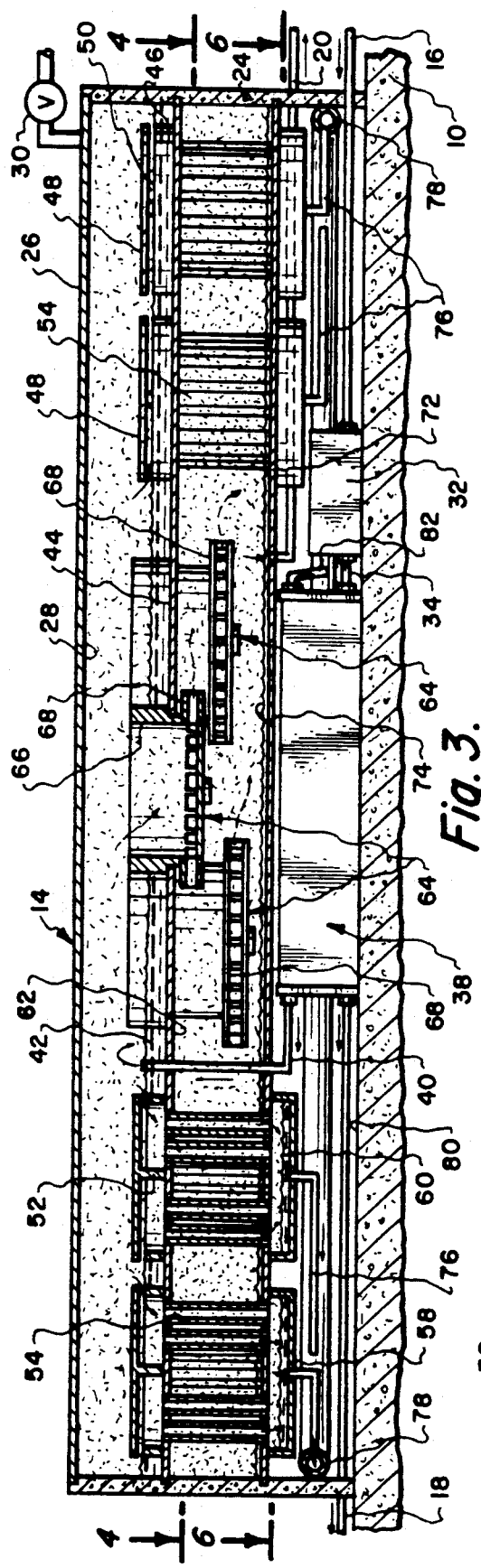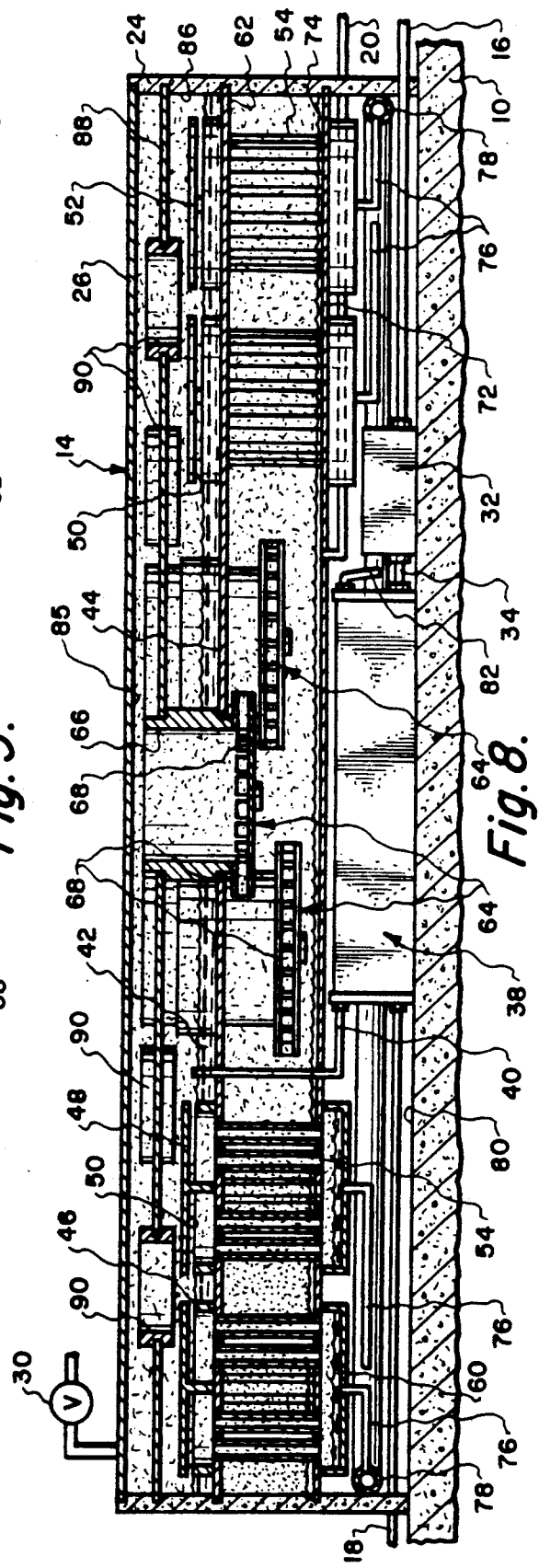

WATER DESALINATION APPARATUS

BACKGROUND OF THE INVENTION

1. Field of the Invention

The field of this invention is directed to the water desalination apparatus which extracts fresh water from sea water or from other types of brackish water.

2. Description of Prior Art

Desalination is a process of converting sea water, which contains 35,000 parts per million of salt, or brackish water, containing 5,000 to 10,000 parts per million of salt, to fresh water suitable for human consumption, household and industrial requirements. The salt in drinking water should not exceed 500 parts per million. Where natural supplies of this quality of water are insufficient, desalination is an alternative to transporting fresh water over long distances by pipeline or tank vehicle.

Many types of evaporators have been used to produce fresh water by distillation. But in the past, the prior art types of evaporators have proved costly and troublesome when used continuously on the large scale which is required. At temperatures over 160 degrees Fahrenheit, sea water and many brackish waters deposit scale (incrustation of insoluble chemical compounds, especially calcium and magnesium salts) which interfere with the operation of the evaporator.

Water normally boils at 212 degrees Fahrenheit, but by reducing the pressure, it will boil at a lower temperature. Hot sea water is exceedingly corrosive. Most prior art methods of removing fresh water from sea water have been most inefficient. Modern desalination processes try to avoid the inefficient operations of the prior art by using forms of low temperature desalination for removing fresh water from sea water.

One modified form of low temperature desalination is vapor compression desalination. Like any other gas, the temperature of steam can be raised by compression. If the compressed steam is then condensed at the higher pressure, its latent heat can be returned to the boiling liquid it came from. This principle is used in the vapor compression desalinator, where the energy is supplied not as heat but by mechanical work. In this process hot sea water is introduced into an evaporator and the steam produced is drawn off and compressed, which raises its temperature as well as its pressure. This steam is then fed into another part of the evaporator where it condenses into fresh water. As it condenses, it heats up the sea water providing more evaporation. The condensed fresh water is quite warm and on its way to storage it is passed through a heat exchanger where the heat is extracted and used to heat up the incoming sea water supply.

The first vapor compression evaporators using mechanical compressors were built in Europe about one hundred years ago. Since that time, thousands of mechanical vapor compression evaporators have been put into service around the world for desalting sea water and brackish water. Several hundred evaporators have been installed in the chemical processing industries to concentrate solutions ranging from inorganic chemicals to temperature sensitive food products. The primary advantage of mechanical vapor compression evaporation over conventional arrangements is far lower energy consumption. The rapidly rising prices of oil and other energy sources in the past have been an increasing incentive to investigate vapor compression evaporation of a means of reducing energy usage and the energy contribution to product costs.

SUMMARY OF THE INVENTION

The prior art vapor compression units have been able to achieve between 60% and 80% efficiency. The vapor compression desalination system of the present invention is able to achieve 85% to 92% efficiency.

Within the water desalination apparatus of the present invention, sea water is pumped through a heat exchanger which absorbs heat from waste water which is also being pumped through the heat exchanger. The waste water is to be deposited back into the source ocean. The inlet sea water is then pumped into a vapor chamber which is located at a reduced pressure. The sea water is permitted to flow by gravity to a lower level through a mass of tubes with this flow to occur at a slow, steady rate. The passage of the sea water through the tubes encourages the sea water to release fresh water vapor with this vapor being moved by centrifugal compressor from the vapor chamber to a condensation chamber which is vertically disposed at a lower level from the vapor chamber. The vapor is to come in contact with the exterior surface of a mass of tubes through which the sea water is flowing with heat transfer occurring between the sea water and the vapor, condensing the vapor producing fresh water which is then extracted by appropriate piping to a storage reservoir. The sea water, which is passed through the tubes, has now become waste water and this waste water is to be conducted through a heat exchanger to raise the temperature of the inlet sea water. The vapor chamber can be divided into multiple levels.

The apparatus of the present invention has an advantage when compared to conventional desalination processes such as reverse osmosis, flash distillation, multi-effect distillation and electrodialysis, which is, the larger the system capacity becomes, the less expensive it becomes to produce desalinated water.

The apparatus of the present invention can be configured in various sizes to satisfy specific community requirements. Output volumes can range from less than one acre foot per day to sixteen acre feet per day where one acre foot equals approximately 325,000 gallons of water. It is this inherent flexibility of the apparatus of the present invention that will allow the apparatus to be responsive and competitive in the world market.

The significant advantage of the desalination apparatus of the present invention is that only a small amount of land is required as opposed to prior art apparatuses where a large amount of land is required.

BRIEF DESCRIPTION OF THE DRAWINGS

FIG. 3 is a vertical cross-sectional view taken through the main housing of the present invention taken along line 3—3 of FIG. 2 showing clearly the vapor chamber and the condensation chamber located above the floor chamber of the apparatus;

FIG. 8 is a view similar to FIG. 3 but of a modified form where the vapor chamber is divided into an upper level and a lower level.

DETAILED DESCRIPTION OF THE SHOWN EMBODIMENT

The primary intent and purpose of the water desalination apparatus of this invention is the ability to produce fresh water at a cost lower than can be obtained currently with prior art technology for desalinating of sea water.

Figure 1:
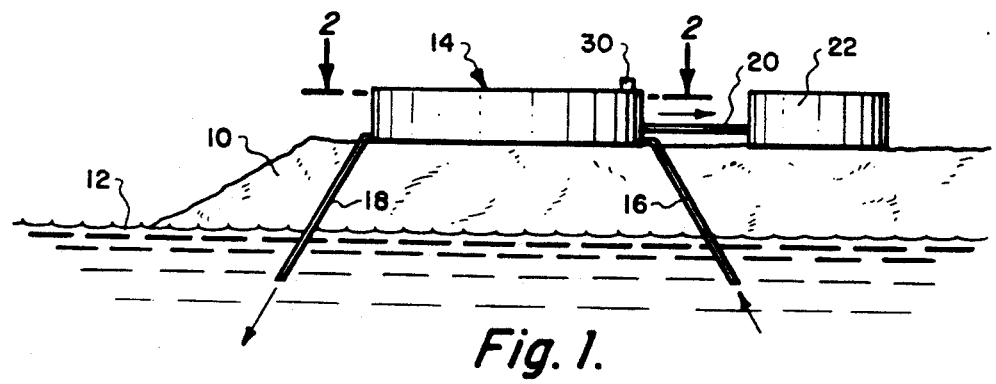
FIG. 1 is an exterior view of the desalination apparatus of the present invention showing a typical installation at a coastal location.
Figure 2:
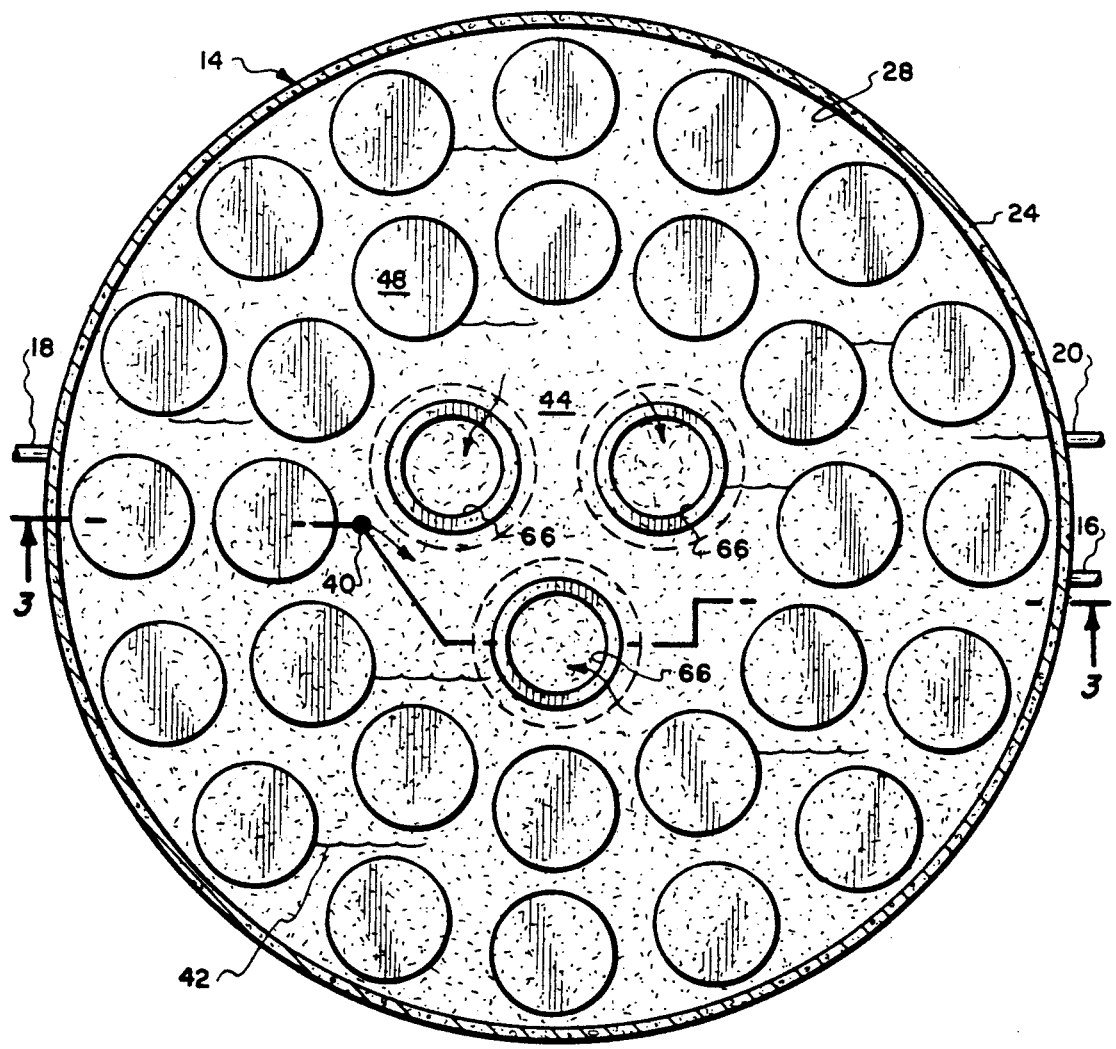
FIG. 2 is a horizontal cross-sectional view taken along line 2—2 of FIG. 1 showing the vapor chamber located within the main housing of the desalination apparatus of the present invention.
Figure 4:
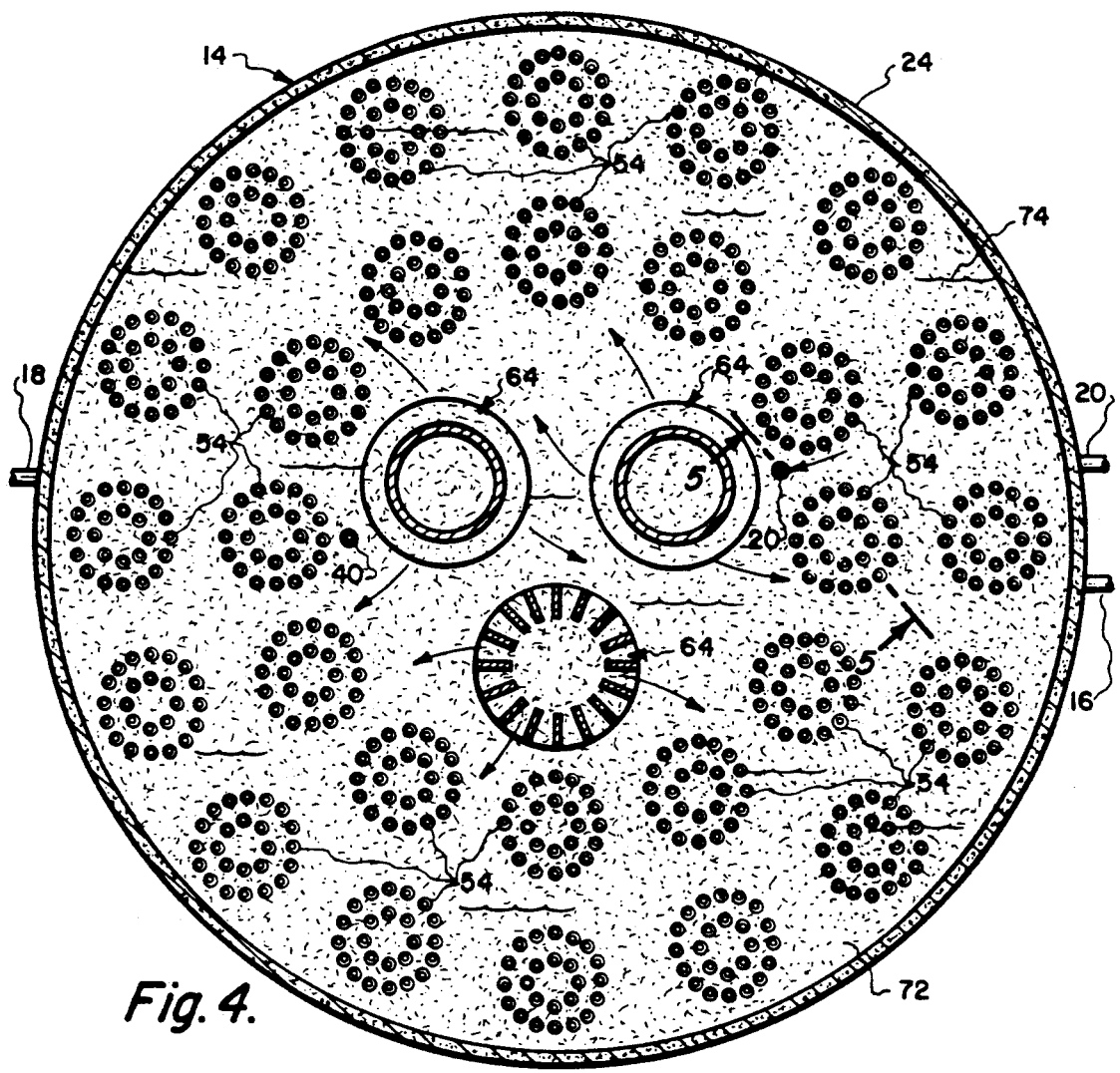
FIG. 4 is a horizontal cross-sectional view through the condensation chamber taken along line 4—4 of FIG. 3.

Referring particularly to FIG. 1, there is shown a peninsula 10 of land located alongside a large body of sea water 12. Fixedly mounted on the land 10 is the main housing 14 of the water desalination apparatus of this invention. Sea water 12 is drawn through pipe 16 into the main housing 14. From the main housing 14 waste water is to be disposed through pipe 18 back into sea water 12. The fresh (distilled) water is discharged from the main housing 14 through pipe 20 to a storage tank 22. Tank 22 is also fixedly mounted on the land 10. From tank 22 the fresh water is to flow to be utilized at appropriate usage sources located remote from the tank 22.

The main housing 14 is formed of a cylindrical side wall 24 which is enclosed by a top 26. The side wall 24 will normally be constructed of a cement material. The diameter of the side wall 24 will be generally about one hundred and fifty feet although larger and smaller sizes could be constructed. The height of the side wall 24 will normally be in the range of thirty feet, however, it is considered within the scope of this invention that greater heights or lesser heights of side wall 24 could be constructed. The top 26 closes the vapor chamber 28 from the ambient. The top 26 could be manufactured of a solar energy absorbing material so as to facilitate the transfer of heat into the vapor chamber 28. Mounted on the exterior surface of the top 26 is a vacuum pump 30. The vacuum 30 is to be utilized for drawing a vacuum within the vapor chamber 28.

The sea water 12 is drawn through pipe 16 by means of pump 32. From pump 32 sea water 12 is moved through pipe 34 into internal piping 36 of a heat exchanger 38. The internal piping 36 is connected to outlet pipe 40 which conducts the sea water, now numbered 42, within the vapor chamber 48.

The floor 44 of the vapor chamber 28 has mounted thereon a plurality of spaced apart cylindrical members 46. Each of the members 46 are of the same height and are covered by a top plate 48. Between each top plate and its respective member 46 is an angular gap 50. Each plate 48 is fixedly mounted by a centrally mounted post 52 onto the floor 44. In actual practice normally there would be approximately 10 feet between the top 26 and the floor 44.

The level of the sea water 42 is to rise until it just begins to flow over each of the members 46 into each of the gaps 50. Each of the gaps 50 is at the same horizontal level so therefore the flowing into each of the gaps 50 will be simultaneous and at the same flow rate. Connecting with the interior of each of the members 46 is a group of vertically oriented water flow tubes 54. These tubes 54 are all identical and are normally constructed of a thin-walled titanium. Connecting with each member 46 will be twenty two (in number) of the tubes 54. However, it is to be understood that the number of these tubes can be decreased or increased without departing from the scope of this invention. The tubes 54 are to be fluted which means that their interior and exterior surfaces are hiatused. This fluting of the tubes is not shown in the drawings as it is well known to flute tubes in salinating apparatuses. Fluting of tubes 54 is accomplished by making indentations in their exterior surface producing protrusions in the interior surface of each of the tubes 54. The reason for this fluting is to increase the overall surface area of each of the tubes 54 internally and externally.

Although the tubes 54 can be manufactured in aluminum, copper/nickel and other materials, it is deemed to be most preferable to have the tubes manufactured in titanium. The reason for the titanium is that such tubes would be highly resistant to the corrosive effects of sea water and should last for at least twenty years of service. The typical wall surface for the tubes 54 will be thirty five thousands of an inch. The fluting of the tubes result in an improvement of fifty percent in the heat transfer coefficient.

Figure 5:
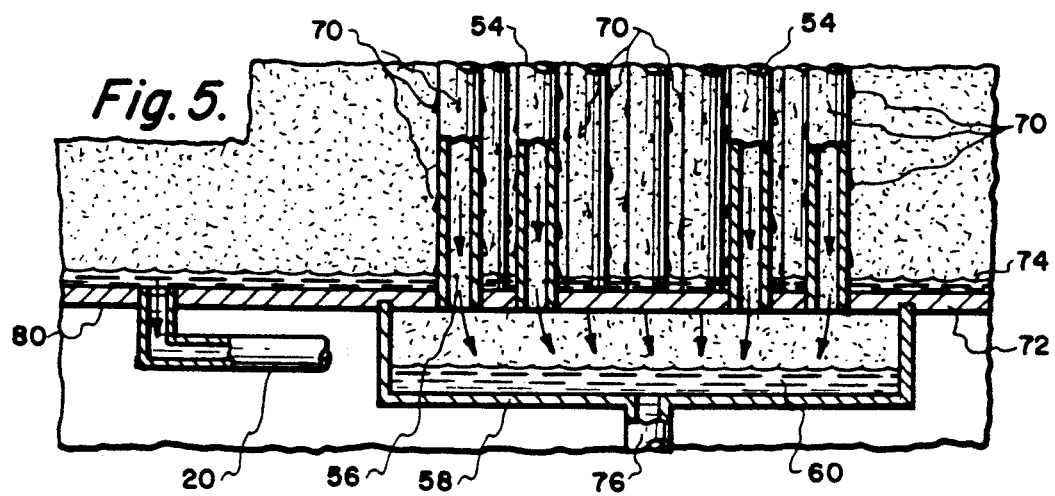
FIG. 5 is a vertical cross-sectional view taken through one of the tube groups utilized within the condensing chamber of the apparatus of the present invention depicting the condensation of the fresh water on the exterior surface of the tubes and the distillation of the fresh water from the sea water within the interior of the tubes.
Figure 6:
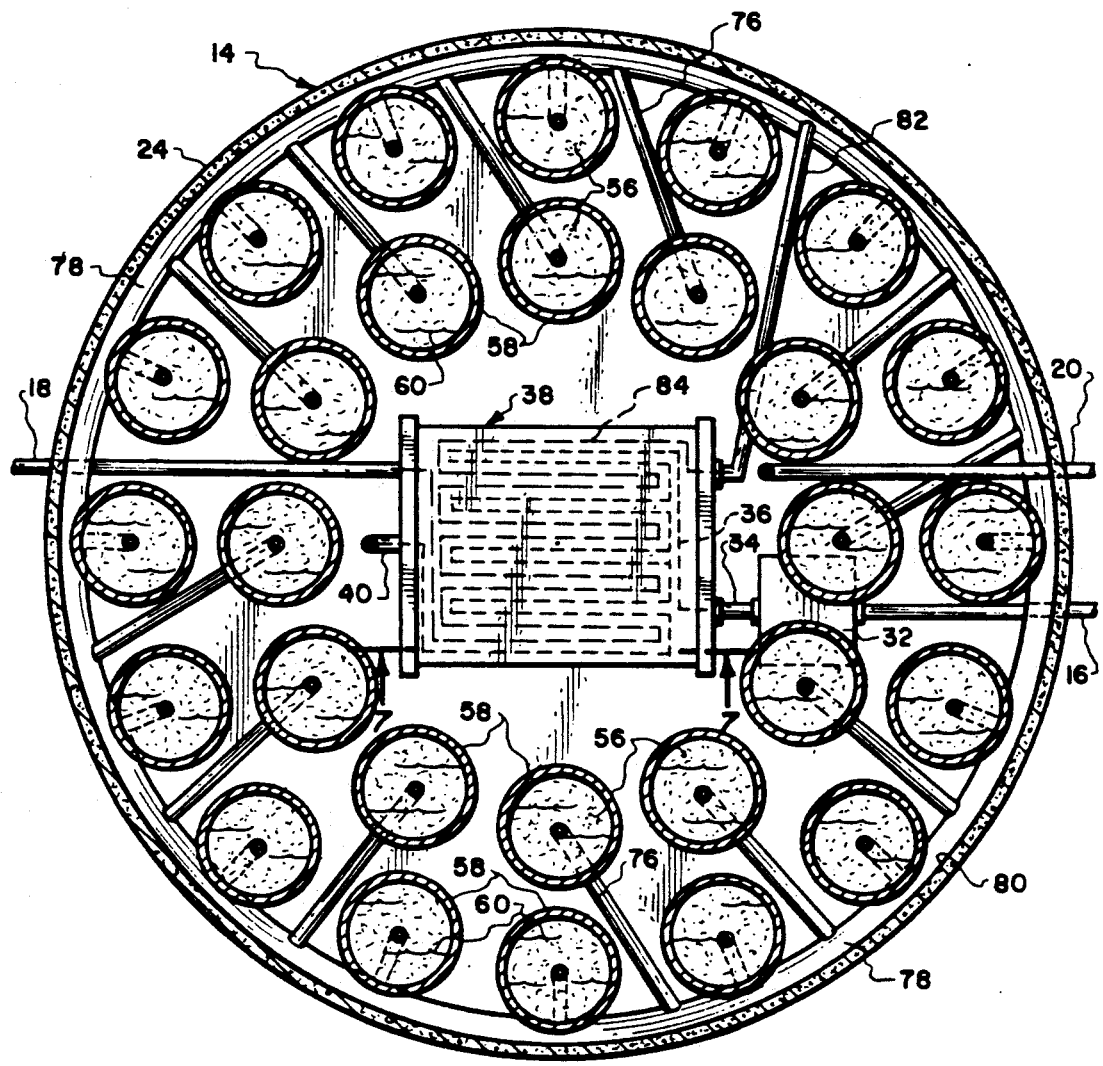
FIG. 6 is a horizontal cross-sectional view through the base floor of the apparatus of the present invention taken along line 6—6 of FIG. 3 showing more clearly the multitude of pans that are utilized to collect the waste water prior to it being conducted through the heat exchanger and then exteriorly of the apparatus of the present invention.

The tubes 54 within each group are layed out in a basically circular pattern. The sea water 42 is to dribble down the inside of each tube 54 and have a tendency to adhere to the side wall of each tube 54. This conducting of the sea water along the inside of the tubes 54 is shown as numeral 56 in FIG. 5. The result is that a very thin layer of the sea water 42 is exposed to the reduced pressure within the vapor chamber 28. This causes the sea water to, in essence, boil and release fresh water vapor. Because of the vast number of tubes 54 that are utilized, there is substantial area of the sea water being directly exposed to the reduced pressure. This area comprises the area within each tube 54 plus the surface of the level of sea water 42 in the vapor chamber 28. The vapor that is created within each tube 54 rises and moves into the vapor chamber 28 even though the sea water 56 is flowing under the action of gravity downward to be deposited within a pan 58. The sea water 56 now becomes waste water 60 within each pan 58. It is to be understood that there is a pan 58 for each group of the tubes 54. Therefore, looking at the drawings of this invention, there are twenty seven (in number) of the pans 58.

The exterior surface of the tubes 54 are confined within a condensation chamber 62. The exterior surface of the tubes 54 are exposed to this condensation chamber 62. The condensation chamber 62 is closed relative to the vapor chamber 28 with the exception of the connection established by centrifugal compressors 64. These compressors 64 are basically conventional in design. Three in number of the compressors 64 are shown. It is considered to be within the scope of this invention that the number and location of the compressors 64 can be varied.

Each compressor 64 has a suction inlet 66. Each suction inlet 66 connects directly to the vapor chamber 28. Each compressor 64 has an annular output 68. The vapor is removed from the vapor chamber 28 into the inlet 66 of the compressors 64. This removing of the vapor further reduces the pressure in the vapor chamber 28 which facilitates the creating of additional vapor. Referring particularly to FIG. 3 of the drawings, each annular outlet 68 of the compressors 64 is located at a different vertical height within the condensation chamber 62. The reason for this is to evenly distribute the vapor within the condensation chamber 62. The vapor from the annular outlet 68 is compressed within the condensation chamber 62. The vapor tends to collect or adhere to the exterior surface of the tubes 54 forming droplets 70 which then run down the exterior surface of the tubes 54 onto the floor 72 of the condensation chamber 62. This distilled or fresh water 74 accumulates on the floor 72. The water 74 flows into pipe 20 and hence into storage tank 22. Approximately seventy percent of the total volume of the sea water 42 is removed in the form of the fresh water 74 leaving approximately thirty percent which compress the waste water 60.

The waste water 60 from each pan 58 flows into a pipe 76. There is a pipe 76 for each pan 58. Each pipe 76 connects with a main pipe 78 which is mounted on the inside surface of the sidewall 24. The pipe 78 is located within the floor chamber 80 which is located between floor 72 and ground 10. The height of chamber 80 will normally be about ten feet which is equal to the individual height of the condensation chamber 62 and the vapor chamber 28.

Figure 7:
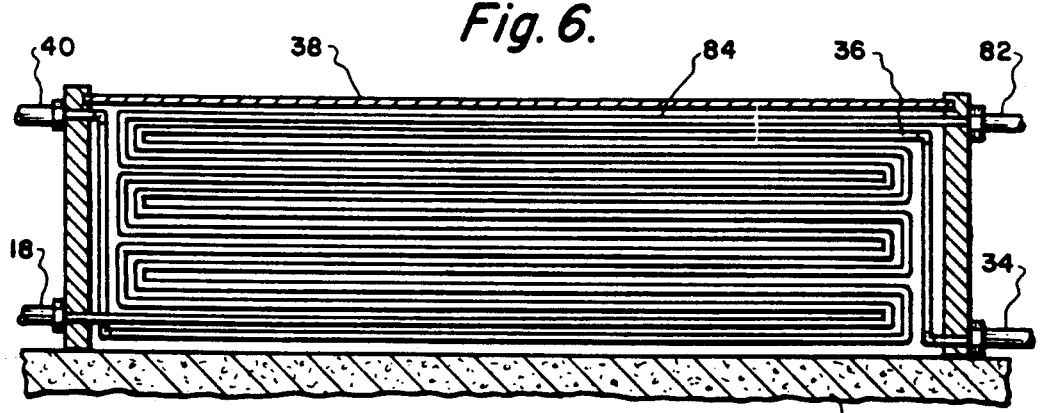
FIG. 7 is a cross sectional view through the heat exchanger taken along line 7—7 of FIG. 6.

From pipe 78 the water flows through pipe 82 into heat exchanger piping 84. The waste water 60 within the piping 84 is at a much higher temperature than the sea water 12 which is flowing through pipe 34 into piping 86 within the heat exchanger 38. A heat transfer occurs therebetween with the sea water now flowing out through pipe 40 being at a much higher temperature than the waste water flowing out from the heat exchanger 38 within pipe 18. It is to be understood that the construction of the heat exchanger 38 can be any particular desired construction and it is actually envisioned that the construction shown in FIG. 7 would not be used in actual practice. The construction of heat exchangers is deemed to be conventional and forms no specific part of this invention.

Referring particularly to FIG. 8, it may be desirable to divide the vapor chamber 28 into an upper section 85 and a lower section 86. The inlet 66 of each compressor 64 connects only with the upper section 85. The sea water 42 is dumped onto the floor 44 which is the bottom surface of the lower section 86. Separating 84 and 86 is a separating wall 88. Mounted within the wall 88 are a plurality of spaced-apart apertures 90. These apertures 90 are located in between the compressors 64 and the sidewall 24 and actually are nearer the sidewall 24. What happens is the suction effect of each compressor 64 is transferred radially outward into apertures 90 which concentrates the suction effect directly in the area over the tubes 54. Normally, there will be a dozen or so of the apertures 90 located in a circular pattern. It is believed that the arrangement shown in FIG. 8 will remove an increased amount of vapor from the water as it is conducted through the tubes 54 since the suction effect is applied directly adjacent the tubes 54.

Wherever applicable, there may be installed a demister. Such a demister may be incorporated in conjunction with each compressor 64. Also, a demister may be incorporated with the fresh water outlet in conjunction with pipe 20. Instead of a demister a two-pass drift and an eliminator such as a type DC-020 made by Brentwood Industries may be used.

It is to be understood that in conjunction with this invention that brackish water includes both sea water and water that is too salty or too impure to qualify as drinking water.

One of the advantages of utilizing the centrifugal compressor 64 is that such increase the agitation of the vapor within the condensation chamber 62. This is to increase the flow of the condensate 70 along the exterior wall surface of the tubes 54. Stagnant vapor inhibits thermal transfer resulting in decreased flow of condensate 70 along the tubes 54. It is desirable to therefore avoid stagnant vapor which is avoided by the use of centrifugal compressors 64.

Each bundle of tubes 54 are to be removable for maintenance. Such removability is not shown within the drawings but it is deemed to be conventional that each bundle of tubes 54 can be constructed accordingly. Also, each pan 58 is to be removable to facilitate cleaning not only of the pan but also of the tubes 54 while the tubes are installed. Normally the pans 58 will be constructed of a non-corrosive material such as fiberglass. Normally there will be little need to clean the outside of the tubes 54 since such are only subjected to distilled water. Whereever possible, the parts of the apparatus of this invention that come into contact with the sea water are to be constructed of a non-corrosive material such as fiberglass and this includes piping.

What is claimed is:

1. A water desalination apparatus comprising:

a main housing divided into a vapor chamber and a condensation chamber;

a water inlet connected to said vapor chamber, said water inlet for supplying brackish water into said vapor chamber with a portion of the brackish water vaporizing producing a vapor within said vapor chamber;

a water outlet connected to said condensation chamber, said water outlet for removing distilled water from said condensation chamber;

means connected to said vapor chamber and said condensation chamber, said means producing a partial vacuum within said vapor chamber and removing vapor from said vapor chamber and discharging said vapor into said condensation chamber;

condensation collecting means mounted within said condensation chamber, vapor within said condensation chamber condensing on said condensation collecting means and then flowing into said water outlet;

said condensation collecting means comprising a plurality of vertically oriented tubes divided into a plurality of groups, each said tube having an exterior wall surface connecting with said condensation chamber and an interior wall surface connecting with said vapor chamber, the brackish water from said vapor chamber to flow along said interior wall surface facilitating the release of water vapor within said tubes from the brackish water, the water vapor released within said tubes rising from said tubes into said vapor chamber which contributes vapor to the vapor that is generated in said vapor chamber, the vapor being caused to condense along said exterior surface of said tubes and then flow into said water outlet, wherein said vapor chamber includes a floor, a plurality of spaced apart cylindrical members being mounted on said floor, each said cylindrical member having an annular gap, said annular gaps all being at the same horizontal level, said cylindrical member being provided for each said group, the brackish water to simultaneously flow into said annular gap at the same flow rate prior to flowing along the interior wall surface of said tubes.

2. The water desalination apparatus as defined in claim 1 further comprising:
a vacuum pump connecting with said vapor chamber, said vacuum pump functioning to further produce a vacuum within said vapor chamber.

3. The water desalination apparatus as defined in claim 1 further comprising:
a heating means for raising the temperature of the brackish water located within said vapor chamber.

4. The water desalination apparatus as defined in claim 3 wherein:
said heating means including a heat exchanger, the brackish water to pass through said heat exchanger prior to entering said vapor chamber, condensed brackish water being discharged from said vapor chamber, said condensed brackish water being conducted through said heat exchanger and functioning to transfer heat energy into the brackish water entering said vapor chamber.

5. The water desalination apparatus as defined in claim 4 further comprising:
a collecting pan associated with each said group, each said collecting pan to collect the condensed brackish water that has flowed through said tubes, said pans being connected to a condensed brackish water outlet, said condensed brackish water outlet being conducted through said heat exchanger prior to being conducted into the ambient.

* * * * *